(12) United States Patent
Bellante

(10) Patent No.: US 10,773,847 B2
(45) Date of Patent: Sep. 15, 2020

(54) PACKAGING MACHINE WITH A MAGNETIC MOVERS CONVEYOR

(71) Applicant: CAMA1 s.p.A., Milan (IT)

(72) Inventor: Daniele Bellante, Garbagnate Monastero (IT)

(73) Assignee: CAMA1 S.P.A, Milan (IT)

( * ) Notice: Subject to any disclaimer, the term of this patent is extended or adjusted under 35 U.S.C. 154(b) by 493 days.

(21) Appl. No.: 14/994,711

(22) Filed: Jan. 13, 2016

(65) Prior Publication Data
US 2016/0207658 A1 Jul. 21, 2016

(30) Foreign Application Priority Data
Jan. 19, 2015 (EP) .................................. 15151588

(51) Int. Cl.
| | | |
|---|---|---|
| B65B 57/16 | (2006.01) | |
| B65B 43/52 | (2006.01) | |
| B65B 51/02 | (2006.01) | |
| B65B 57/00 | (2006.01) | |
| B65G 54/02 | (2006.01) | |
| B65B 35/10 | (2006.01) | |

(Continued)

(52) U.S. Cl.
CPC ............. *B65B 57/16* (2013.01); *B65B 35/10* (2013.01); *B65B 43/26* (2013.01); *B65B 43/52* (2013.01); *B65B 51/02* (2013.01); *B65B 57/00* (2013.01); *B65B 57/08* (2013.01); *B65G 54/02* (2013.01)

(58) Field of Classification Search
CPC ... B65G 54/02; B65B 57/06–20; B65B 43/08; B65B 43/10; B65B 43/265; B65B 43/46; B65B 43/52; B65B 57/02; B65B 57/04; B65B 57/08; B65B 65/003

USPC ....... 53/396, 456, 458, 484, 491, 64, 67, 77, 53/564, 249, 250, 376.3; 198/619, 459.8, 198/462.2, 460.1, 418.9
See application file for complete search history.

(56) References Cited

U.S. PATENT DOCUMENTS

| | | | | |
|---|---|---|---|---|
| 4,392,435 A | * | 7/1983 | Moody | .................. B61B 13/08 104/281 |
| 4,394,896 A | * | 7/1983 | McComas | ............... B65B 57/16 198/341.06 |

(Continued)

FOREIGN PATENT DOCUMENTS

| | | |
|---|---|---|
| DE | 102012209978 A1 | 12/2013 |
| DE | 102012025326 A1 | 6/2014 |

(Continued)

OTHER PUBLICATIONS

European Search Report from European Application No. EP 15151588 dated Apr. 21, 2015.

(Continued)

*Primary Examiner* — Dariush Seif
(74) *Attorney, Agent, or Firm* — Dorsey & Whitney LLP

(57) ABSTRACT

Packaging machine of articles into containers, comprising a plurality of work stations, each work station comprising one or more working devices of the packaging machine; a conveyor of containers using movers and a linear motor, comprising a path and a plurality of independently controllable movers, wherein the control system of the machine is configured so as to dynamically vary a master/slave configuration between the motion control of the movers on the path, and the control of the working devices of the packaging machine.

17 Claims, 2 Drawing Sheets

(51) Int. Cl.
*B65B 43/26* (2006.01)
*B65B 57/08* (2006.01)

(56) References Cited

U.S. PATENT DOCUMENTS

| | | | |
|---|---|---|---|
| 4,604,704 A * | 8/1986 | Eaves | G06Q 10/08 198/460.1 |
| 4,660,350 A * | 4/1987 | Hogenkamp | B65B 57/04 198/419.3 |
| 5,004,094 A * | 4/1991 | Brandt | B65G 43/08 198/460.1 |
| 5,137,139 A * | 8/1992 | Ruscello | B65G 43/08 198/460.1 |
| 5,377,474 A * | 1/1995 | Kovacs | B65B 9/2028 53/451 |
| 5,485,712 A * | 1/1996 | Cherney | B65B 9/2028 53/436 |
| 5,966,908 A * | 10/1999 | Philipp | B65B 9/067 53/450 |
| 6,038,967 A * | 3/2000 | Chak | B65B 13/22 100/2 |
| 6,285,918 B1 * | 9/2001 | Kono | G01G 19/393 53/502 |
| 6,286,428 B1 * | 9/2001 | Madsen | B41F 17/001 101/227 |
| 6,513,641 B1 * | 2/2003 | Affaticati | B07C 5/36 198/357 |
| 6,715,598 B2 * | 4/2004 | Affaticati | B07C 5/36 198/357 |
| 6,876,896 B1 * | 4/2005 | Ortiz | B29C 65/02 318/135 |
| 7,260,922 B2 * | 8/2007 | Harding | B31D 5/0047 493/29 |
| 8,448,412 B2 * | 5/2013 | Cere | B65B 11/025 53/399 |
| 8,561,375 B2 * | 10/2013 | Kiel | A21C 9/08 53/237 |
| 2003/0168316 A1 * | 9/2003 | Knepple | B65G 37/02 198/460.1 |
| 2003/0195651 A1 * | 10/2003 | Cherfane | G05B 23/0213 700/231 |
| 2003/0230941 A1 | 12/2003 | Jacobs | |
| 2012/0175223 A1 * | 7/2012 | Breen | B65G 43/10 198/459.8 |
| 2013/0152516 A1 * | 6/2013 | Sammons | B65B 9/087 53/562 |
| 2013/0227914 A1 * | 9/2013 | Allgaier | B65B 35/00 53/285 |
| 2013/0232924 A1 * | 9/2013 | Bergman | G05B 19/4183 53/507 |
| 2014/0352257 A1 * | 12/2014 | Voss | B65H 23/1888 53/396 |
| 2015/0075120 A1 * | 3/2015 | Schablin | B65B 57/02 53/556 |
| 2015/0139772 A1 | 5/2015 | Rapp et al. | |
| 2016/0244273 A1 * | 8/2016 | Schaeuble | B65G 47/914 |

FOREIGN PATENT DOCUMENTS

| | | |
|---|---|---|
| DE | 102012223173 | 6/2014 |
| EP | 0695703 | 2/1996 |
| EP | 1123886 | 8/2001 |
| EP | 2746165 | 6/2014 |
| EP | 2779390 | 9/2014 |
| WO | 9627544 A1 | 9/1996 |
| WO | WO 03/105324 | 12/2003 |
| WO | 2014202575 A1 | 12/2014 |

OTHER PUBLICATIONS

Beckhoff, "Application example: Bottling plant with XTS", https://www.beckhoff.com/english.asp?start/hightlightarchiv.htm.
Beckhoff, "DE XTS-Applikationsbeispiel: Flaschenabfullanlage", https://www.youtube.com/watch?v=H7tuGPWe4WE.
Beckhoff, "Embedded-PC CX2000: PCT-based Control als Basistechnologie Fur Industrie 4.0", PC Control The New Automation Technology Magazine, Nr. 2, Jun. 2014, 67 pages.
Beckhoff, "XTS application example: Bottling plant", https://www.youtube.com/watch?v=HiA1I1v3-U.
Beckhoff, "XTS Revolutioniert Maschinenbau in Verpackungsindustrie", PC Control The New Automation Technology Magazine, Packaging—Special 2014, May 2014, 70 pages.
"Delivering Superior Machine Automation PACSystems, PACMotion and FANUC Servos", GE Intelligent Platforms, 2010, 20 pages.
"How to change publishing date for YouTube video", How to change publishing date for YouTube video—YouTube Help, https://support.google.com/youtube/forum/ AAAAiuErob UuaN fcNFHx84?hl=en, Jun. 3, 2019, 3 pages.
"Integrating Next Generation Motion Control with Programmable Automation Controllers", GE Fanuc Intelligent Platforms, 2008, pp. 1-14.
"Maschinenautomatisierung mit PACMotion", https://www.elektroniknet.de/maschinenautomatisierung-mit-pacmotion-1327.html, including translation of relevant paragraphs, Mar. 15, 2019, 18 pages.
"PACMotion* High-performance motion control improves productivity", GE Intelligent Platforms, 2012, 2 pages.
"Schedule video publish time", Schedule video publish time—YouTube Help, https://support.google.com/youtube/answer/1270709?hl=en, Jun. 3, 2019, 2 pages.
"YouTube showing publishing date (not uploading date)?", YouTube showing publishing date (not uploading date)?—YouTube Help, https://support.google.com/youtube/forum/ AAAAiuErobUEK9HSukT7LQ?hl=en, Jun. 3, 2019, 3 pages.
Beckhoff, "PCControl The New Automation Technlogy Magazine", Screenshot von WaybackMachine, Oct. 5, 2014, 2 pages.

* cited by examiner

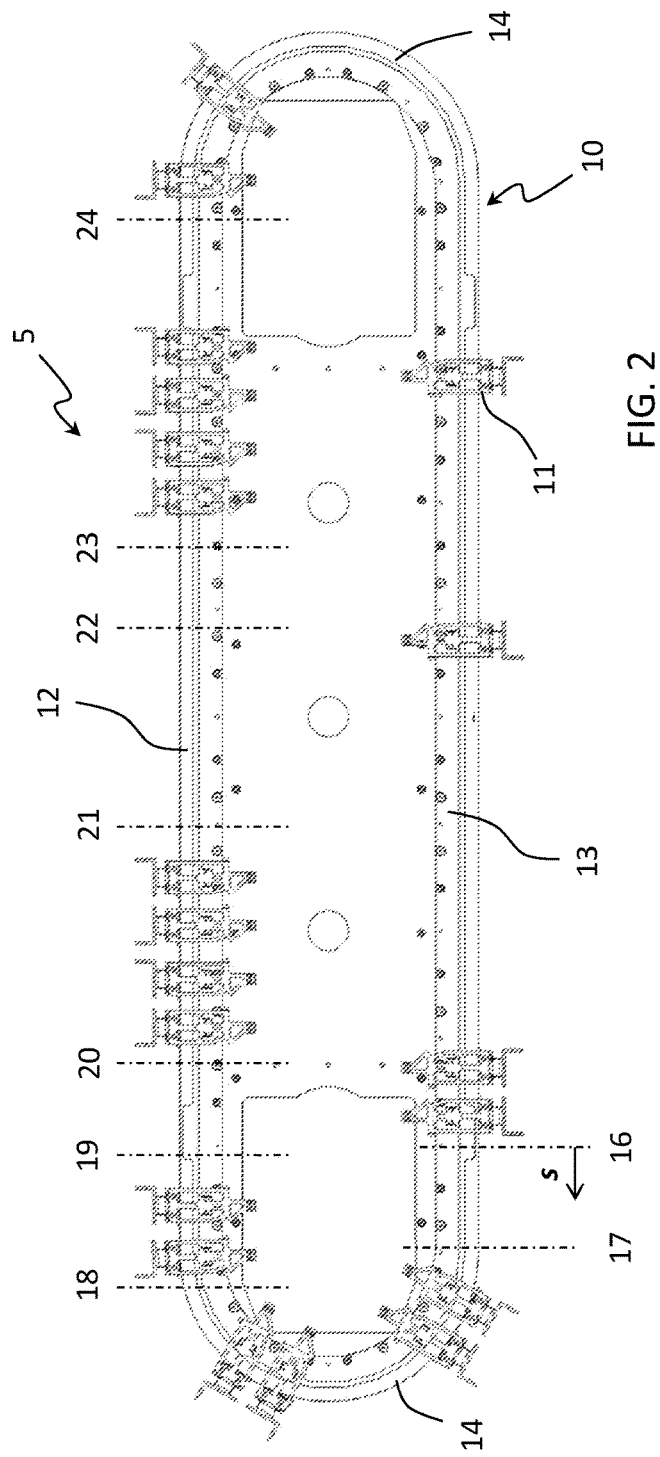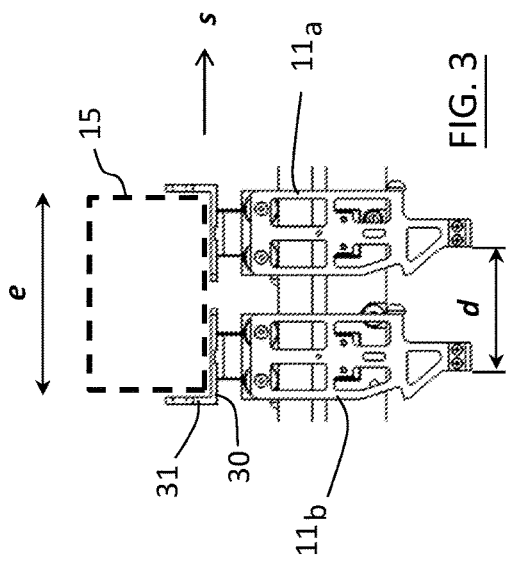
FIG. 2
FIG. 3

US 10,773,847 B2

PACKAGING MACHINE WITH A MAGNETIC MOVERS CONVEYOR

TECHNICAL FIELD

Embodiments of the present invention concern the field of packaging and refers to a packaging machine comprising a magnetic drive conveyor.

BACKGROUND

In a packaging machine there is the need for a conveying system suitable for transferring items and/or containers between sections of the machine itself.

For example, a packaging machine typically comprises a container forming section for picking up and forming containers, a loading section for loading items into containers, a closing section for closing the containers, an output section for expulsion from the machine. The conveying system carries the containers from the container forming section to the loading section, transfers the loaded containers from the loading section to the closing section, and carries the closed boxes to the output section.

A simple and still used conveying system is represented by conveyor belts, which however are poorly flexible because all objects on a conveyor belt move at the same speed maintaining the same distance apart. An evolution of conveyor belts is described in EP 0695703 and is also known as servotrain system or multi-axis system, and essentially comprises several adjacent belts with independent motors and control. A further and more recent evolution of the conveying system is represented by the magnetic drive conveyor and relative movers.

Said conveyor comprises a plurality of movers, sliding along a path. The path is represented for example by a closed-loop track and is formed by joining different straight and curved sections.

The movement of the movers along the path is controlled electromagnetically. Each mover comprises at least one reactive element to interact electromagnetically with active elements incorporated in at least part of the path. The interaction between said active and reactive elements propels the movers and provides the desired control of movement. The active elements integrated in the conveyor are normally represented by windings capable of generating a magnetic field when excited by an electric current, and the reactive elements installed on the movers are represented by permanent magnets.

The movement of each one of the single movers (position, speed and acceleration) can be controlled independently relative the other movers. A magnetic drive conveyor generally comprises also one or more sensors to detect the position of the movers along the path.

The magnetic drive conveyor is known and is described for example in WO 03/105324. A detailed description of the propulsion system is given for example in EP 2 779 390.

A magnetic drive conveyor of the type described above offers several advantages over conventional conveyors: independent control of any number of movers along the same path; possible implementation of complex laws of motion, unattainable with the conventional method; movers propelled with no direct contact and no mechanical parts like belts or gears; low friction; fast speed and acceleration of the movers; accurate control of their position along the path.

The application of magnetic drive conveyors in the field of packaging machines is known in itself. The movers can be used, for example, to carry items or containers, either full or empty, also by means of auxiliary conveying members such as pockets or equivalent means suitably fixed to the movers.

However, up to now the success of said magnetic drive conveyors in the field of packaging machines has been less than expected.

One of the main reasons why embodiments of the prior art are unsatisfactory lies in the interface of the control of the magnetic drive conveyor with the control of the packaging machine itself.

Generally, a magnetic drive conveyor has its own programmable control system that dynamically manages the various movers (motion control) according to a predetermined operating cycle. Said control system is user-configurable to implement a desired law of motion of the movers. Up to now, the prior art has followed the approach of defining a substantially fixed (i.e. static) law of motion of the movers and operating cycle, based on the operations carried out by the packaging machine. For example, in a machine which operates intermittently it is generally chosen to provide intermittent motion of the movers during the operative steps (typically during loading), whereas in other work steps (typically in a return stroke) the motion of the movers can be continuous. Moreover, the flexibility of control of the conveyor is used to make the movers proceed with different speeds along different portions of the path, for example accelerating during the return stroke to reduce the waiting times.

However, this approach only partially exploits the advantages of flexibility and configurability of the magnetic drive conveyor. Following this approach of the prior art, it has been seen that performance is not much better compared to a multi-axis system, and may not compensate for the extra cost of the magnetic drive conveyor. One or more embodiments of the invention aim to solve this problem.

SUMMARY

Embodiments of the invention have the purpose of improving the technique of magnetic drive conveyor in the field of packaging machines.

This purpose is accomplished with a machine for packaging items in containers comprising:
a plurality of work stations, each work station comprising one or more working devices of the packaging machine;
at least one magnetic drive conveyor arranged to convey items and/or containers between said work stations, said conveyor comprising a path and a plurality of movers, moveable along said path and independently controllable;
the machine being characterised in that it comprises a control system configured so as to dynamically vary a master/slave configuration between the motion control of said movers along the path and the control of said working devices of the packaging machine.

Some preferred aspects of the invention are defined by the dependent claims.

One or more embodiments of the invention follow a dynamic rather than static approach, in contrast to the prior art. The control of the magnetic drive conveyor is dynamically slaved to the control of the machine, or vice-versa, so as to optimise performance. More specifically, at least one embodiment of the invention proposes to use a master/slave configuration between the control of the conveyor and the control of the machine.

A packaging machine according to at least one embodiment of the invention comprises a control system that coordinates the devices of the machine with the movers of the magnetic drive conveyor. Such interaction is managed according to a master/slave configuration that is dynamically configurable. The term master/slave configuration is well known in the field and substantially indicates that a generic device called master controls another device called slave.

The aforementioned master or slave configuration is dynamically variable according to the work station involved. Work stations can comprise, for example: a station for picking up die-cut blanks and formation of containers, a loading station of items in containers, a box-closing station, an outlet or expulsion station from the machine, or other.

The machine-devices can be mobile or fixed parts; said devices can be electrically controlled (motor actuations), electro-pneumatically controlled (pistons, valves, etc.) or have more complex control (robots, mechanical hands, etc.). Examples of mobile devices are: the system for picking up die-cut sheets (called feeder), the system for inserting products (inserter or loading robot), mobile devices for folding the flaps of the containers (called edge-turner). Examples of fixed systems are glue-spraying guns.

The magnetic-movers conveyor is made with active and reactive elements, preferably using electromagnetic propulsion. The motion of the single movers, controlled by the controller of the magnetic drive conveyor, is generated by the electromagnetic interaction between the active and reactive elements respectively associated with the movers and the path, or vice-versa. The propulsion system exploits the principle of linear electric motors that are known in the prior art.

The movers slide along the path of the conveyer on suitable sliding guides.

The control system of the machine advantageously includes a first controller (machine controller) that controls the machine-devices and a second controller (conveyor controller) that controls the magnetic actuation of the conveyor. Advantageously, said two controllers interact real-time and are interfaced with each other to obtain said master/slave interaction between the machine-devices and the magnetic drive conveyor.

In some embodiments of the invention, the control of the machine-devices and of the conveyor can be grouped in a single controller, suitable for managing all the machine-devices and the motion of the movers as well.

In the rest of the description reference will be made to a machine controller and to a conveyor controller with the understanding that the functions of said two controllers can be grouped in a single controller.

The conveyor controller is a device that generates the movement of the movers and determines, for each mover or for each group of movers, a respective law of motion. In preferred embodiments of the invention, said law of motion is a function of one or more parameters generated by the machine controller. For example, the machine controller determines a set of position and movement parameters for each work station and for each mover or group of movers.

Moreover, and more advantageously, the machine controller determines the formation and the separation of groups of movers according to the position along the path.

The parameters of the motion include, for example, speed, acceleration, deceleration and position. For a group of movers, the parameters of the motion can also include the distance between the movers of the group. Said parameters are specific to each work station and are managed independently by the machine controller.

In some embodiments of the invention, the movers are controlled in groups. A group of movers means a set of movers that have the same law of motion or that have interdependent laws of motion. For example, a group of movers can be controlled to maintain a desired distance between the movers.

According to an aspect of the invention, the groups are created dynamically. This means that the movers can be controlled in groups along at least a first portion of the path, and can be controlled individually along at least a second portion of the path. For example, the movers can be controlled in groups along an active path portion that corresponds to the interaction with the machine devices or at least with some of them, and can be controlled individually along an inactive path portion that substantially acts as return path. Advantageously, the generation and separation of the groups are determined by the machine controller, through the parametrization of the above mentioned law of motion.

Along an inactive or return portion in the path, movers can be queued by the control system. In said queuing step the single movers are managed by the machine controller so that the motion of each individual mover interacts with the preceding mover and with the following mover, to prevent mechanical interaction or collision between the various movers.

A group of movers can comprise any number of movers. In some embodiments, the groups are represented by pairs.

A group of movers comprises a front mover, a rear mover, and possibly one or more intermediate movers. The distance between the front mover and the rear mover of a group is advantageously determined as a function of a dimension of the containers or of the items to be conveyed, for example as a function of their length. In groups comprising more than two movers, one or more intermediate movers have the function of supporting the respective container or item. Said distance between the front mover and the rear mover can be changed by adaptation to specific machine functions. For example, as will be described in greater detail hereafter, a small increase of this distance is advantageous during loading to allow for small alignment movements of a container transported by the group of movers.

A machine according to at least one embodiment of the invention can comprise a single conveyor or a plurality of magnetic drive conveyors and relative movers. For example, a machine can comprise a first conveyor for items and a second conveyor for containers. In embodiments that comprise a plurality of conveyors, the machine controller dynamically interfaces in real time and in master/slave mode with each of the conveyors.

Another aspect of the invention consists of a method for controlling a packaging machine of items in containers according to the principles that have been described.

The noticeable advantage of at least one embodiment of the invention is the optimal integration between the controller of the packaging machine and the controller of the conveying system. Thanks to such integration, full exploitation of advantages of magnetic drive conveyors in a packaging machine is allowed.

It should be noted, on this point, that the prior art control of conventional conveyor belts is relatively simple, being substantially limited to the actuation of one or more motors. Conventional packaging machines are made substantially according to two principles: machines named "intermittent" where the conveyor belt stops or advances step by step at certain work stations, or "continuous" machines where the conveyor advances at a constant speed and the sub-systems are synchronised with the conveyor. However, these two techniques are inefficient with conveyors based on movers and linear motor since they do not adequately exploit their greater flexibility.

At least one embodiment of the invention provides a new method introducing a dynamically varied master/slave configuration between the conveyor and the packaging machine. Movers or groups of movers are dynamically configured as master or slave to one or more devices of the machine or machine functions, and said dynamic re-configuration is carried out based on the relevant region of the path and/or the machine function involved. By doing so, the advantages of the conveyor, including for example the speed and the precise positioning of the movers, are fully exploited.

For example, in a station for picking up and depositing containers, the forward motion control of a group of movers is configured by the controller machine as slave to the device for picking up and depositing the die-cut blanks (machine-device). This machine-device, also called feeder member, has the task of picking up the die-cut blank from the store, opening the die-cut blank and place it on the group of movers. Synchrony between the feeder member and the groups of movers intended to receive the container is quite important in this step. The position of the front and rear movers of the group of movers is particularly important for the correct formation of the box. Hence in this step the feeder device is advantageously configured master of the group of movers.

On the other hand, in the subsequent folding station of one or more edges of the box by means of the edge-turning devices managed by the machine controller, the machine-devices are controlled as a function of the position of the group of movers. Hence the control of the group of movers is dynamically reconfigured by the machine controller as master with respect to the edge-turning devices.

In other words, in the first case the machine controller ensures that a machine device (in this case the feeder member) is "master" to the group of movers of the magnetic-drive conveyor, more precisely to the group of movers in transit in the box formation area; in the second case, the movers of the magnetic-drive conveyor master the machine-device (edge turner).

This dynamic reconfiguration makes it possible to obtain the maximum advantage of the integration of a magnetic-drive conveyor in a packaging machine, increasing its flexibility and productivity (pieces/min) and reducing the risk of errors or rejects.

The containers, in a preferred application, are represented by cardboard containers or boxes. Preferably, a machine according to at least one embodiment of the invention is a secondary packaging machine of articles into containers.

The advantages of one or more embodiments of the invention will become even clearer with the help of the following detailed description, which is given as an example and not for limiting purposes.

BRIEF DESCRIPTION OF THE FIGURES

FIG. 2 schematically shows the magnetic-drive conveyor of the machine of FIG. 1.

FIG. 3 schematically shows a box transported by a pair of movers of the magnetic-drive conveyor of FIG. 2.

DETAILED DESCRIPTION

Figure 1:
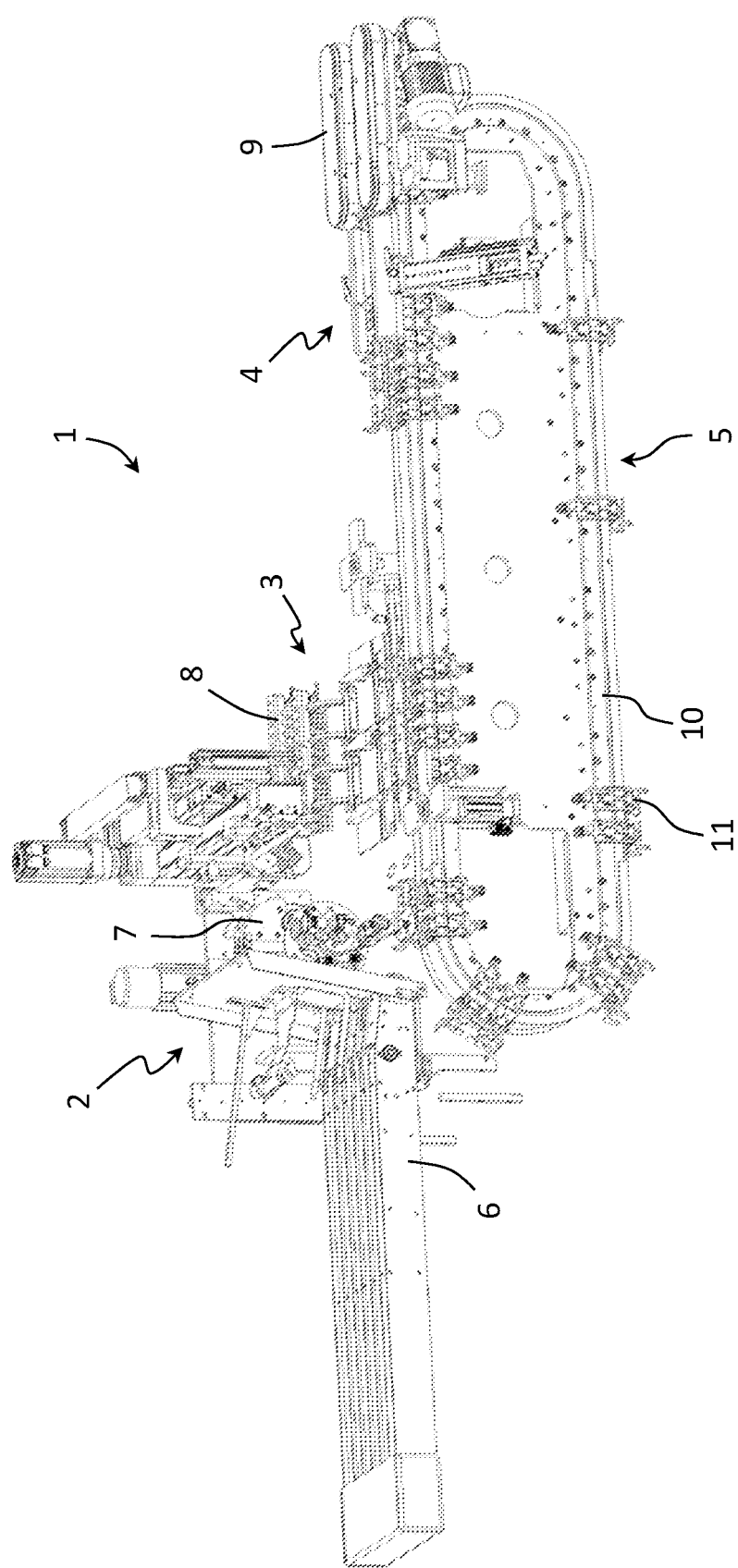
FIG. 1 shows main components of a packaging machine according to an embodiment of the invention, comprising a magnetic-drive conveyor.

FIG. 1 shows an assembly 1 of the main components of a packaging machine of articles into cardboard boxes. The frame of the machine is not shown for easy representation.

The figure in particular shows a box forming section 2, a loading section 3, a closing section 4 and a magnetic drive conveyor 5, suitable for conveying the boxes from one section to another.

The sections 2, 3 and 4 comprise suitable devices which are known in the art.

For example, the section 2 comprises a store 6 for flat cardboard die-cut blanks and a rotary feeder member 7 to pick up the die-cut blanks from said store 6 and delivery to the conveyor 5. The box is shaped during this operation (called opening).

The section 3 comprises at least one device 8 for loading or inserting articles into the boxes. Said device 8 can be for example an inserter or a more complex device like a robot.

The closing section 4 comprises, for example, glue sprayers and mobile members for positioning the edges of the boxes that are known in the art and need not be described in detail.

Further auxiliary mobile members can be distributed along the path of the conveyor 5 according to requirements.

The conveyor 5 is dedicated to transportation of boxes, initially empty and then containing the product, by means of suitable movers 11. The generic term product is used to mean one or more articles which may be of various kinds, such as food products, cosmetics, or other.

Said conveyor 5 substantially extends from the box forming section 2 to the box closing section 4, and delivers the closed boxes to an output device 9.

The conveyor 5 comprises a composition of linear motors having rectilinear and curved section. Said composition forms a path 10, along which a plurality of movers 11 is installed that constitute the mobile part of the device. Said movers 11 are also called trolleys or shuttles.

The movers 11 are operated electromagnetically, typically by means of windings incorporated in the path 10, or at least in some parts thereof, and magnets associated with the movers 11. Said operating principle is known in the field (see for example EP 2779390) and is not described here any further.

The path 10 is closed and essentially comprises a work branch 12, a return branch 13, and joints 14. The position of a generic mover 11 can be described by a linear coordinate s along the path 10, as shown in FIG. 2.

The machine is equipped with a control system preferably comprising a first controller and a second controller. The first controller manages the devices involved in the packaging operations, for example a feeder device, a loading device (robot or inserter), gluing devices (glue guns), edge-closing devices (edge-turners), box-expulsion and outlet devices (belts or bands). These operations will be indicated hereafter as machine functions. Said controller (also called machine controller) is usually a programmable logic and is more generally defined as PLC (Programmable Logic Controller).

The machine controller manages the aforementioned second controller, which in turn manages the conveyor 5 and the relative movers 11. Said second controller, for example, can be implemented on a hardware platform supplied together with the conveyor 5 or can be implemented on different platforms. As an alternative, said second controller can be integrated in the machine controller.

The movers 11 are used, in this example, to transport boxes from the pick-up and forming section 2 to the outfeed section 8. Said movers 11 are controlled by the machine controller in groups, each group being formed by at least two movers 11 so that the distance between the first and the last mover of the group is constant during the movement inside the work station. Said distance, taken on the coordinate s, is a function of the size of the box and possible system corrections preset by the machine controller.

FIG. 3 shows a group of movers, formed by two movers 11a, 11b, which transport a container 15. The container 15 is received between the shoulders 31 of two pockets 30 respectively fixed to the mover 11a and 11b. The free distance d between the two movers determines a distance e between the two shoulders 31 which is equal to the length of the container 15. Based on the forward motion s, the mover 11a is termed front mover of the group and the mover 11b is termed rear mover.

The container 15 is typically shaped like a parallelepiped comprising a bottom wall, side walls, a cover and closing edges to allow gluing. Other more elaborate shapes of container can nevertheless be used.

The groups of movers are formed and split dynamically by the machine controller. For example, the machine controller assigns two movers 11 to a group and controls them through the interaction with the controller of the conveyor 5 that generates its movement (keeping them a substantially constant distance apart) along control sections of the branch 12 of the path of conveyor 5. The branch 12 is where most of the interactions between the movers 11 of a group and the various machine functions take place.

In the return step along the branch 13, the group of movers 11 can be split, meaning that it is managed by the machine controller independently. The motion control of the single movers is managed by the machine controller through interaction with the previous mover and the next mover so as to prevent collisions between the various movers. This step is defined as queuing.

Said control of the single movers 11 by the machine controller (queuing control) ends at the end of the branch 13. At this point, the single movers can be assigned to two different groups and restart the cycle (dynamic reassignment).

Referring again to FIG. 3, the distance d can be varied dynamically during some machine functions. For example, and preferably, said distance is increased during the loading of the products. The applicant has found that allowing a small longitudinal displacement of the container during the loading operation is advantageous, because it allows the container to perform small alignment movements to "follow" the load. This provides faster loading, reducing the risk of wrong positioning or loss of the product.

The path 10 comprises different zones which are recognised by the machine controller, and are denoted in FIG. 2 by numerals 16 to 24. These zones are also defined as work stations.

As a non-limiting example, in a preferred embodiment of the invention, the machine functions are the following.

Position 16: queuing of the movers 11 waiting for a new work cycle. In this position, the movers returning along the branch 13 line up a small distance apart. The machine controller determines all of their dynamic movement parameters, and the controller of the conveyor actuates their movements.

Position 17: waiting for a box. The single movers are assigned to a group and arranged at a predetermined distance. Such a distance can be different from the work distance d given as an example in FIG. 3, for example said distance can be greater in order to avoid a collision while travelling through the curve of joint 14. The machine controller controls all of their dynamic movement parameters, and the controller of the conveyor actuates their movements.

Position 18: receiving the box. The movers of a generic group, intended to receive and transport the container, assume the work distance d (FIG. 3) and receive a box 15, for example from a rotary feeder of the section 2. Said movement of the group of movers takes place in master/slave synchronism with the machine device. The machine controller controls all of their dynamic movement parameters, and the controller of the conveyer actuates their movements.

Position 19: waiting to load the product. The movers stay at the working distance d. In this step the formation process of the box can be completed, so that the box is prepared to receive the product, for example by opening and suitably folding the cover and/or the edges of the box. In such a step the movers of the group interact with a machine device called edge-turner. Such movement of the group of movers takes place in master/slave synchrony with the machine device. The machine controller controls all of their dynamic movement parameters, and the controller of the conveyer actuates their movements.

Position 20: loading of the product into the box. According to a preferred aspect of the invention, during loading the distance between the front mover and rear mover in the corresponding group can be increased to a value d+x slightly greater than the value d represented in the figures, in order to allow the box 15 to perform small forward or backward displacements during loading. The machine controller controls all of their dynamic movement parameters, and the controller of the conveyer actuates their movements. Reaching the correct position triggers the interaction with other machine functions. The whole is controlled and actuated by the machine controller.

Position 21: waiting for gluing.

Position 22: start of the box-closing cycle, to prepare the box for the subsequent gluing cycle. The movers 11 of the corresponding group stay at the work distance d. In this step, the movers of the group interact with a machine device called edge-turner. Said movement of the group of movers takes place in master/slave synchrony with the machine device. The machine controller controls all of their dynamic movement parameters, and the controller of the conveyer actuates their movements.

Position 23: gluing. In this step the presence of the box is detected with a photocell and the glue is applied, for example with two guns mounted at the sides of the path 10. In such a step the movers of the group interact with the machine devices for application of glue. The control of such devices is carried out with a position cam. In this step one of the movers of the group is master of the glue-application devices. The machine controller determines its activation by controlling the position through the controller of the magnetic-drive conveyor.

Position 24: outfeed. The closed box 15 is delivered to the outfeed device 8. In this step the front mover 11a accelerates with respect to the mover 11b so as to increase the distance and facilitate the delivery of the box to the outfeed device. The movers then head to the queuing position 16. In this step the machine controller controls all of the dynamic movement parameters of the single movers inside the group, determining the point of increase in distance thereof, and the controller of the conveyor actuates the movements thereof.

The operative steps that have been described are examples and they can vary according to contingent requirements.

It should be noted that the machine control and the conveyor control are interfaced with a master/slave configuration that is varied dynamically. More specifically, a specific pair of movers 11 can be configured as "master" to a machine function or several machine functions (i.e. one or more respective devices) and then reconfigured as "slave" to one or more other machine functions, and so on.

For example, a pair of movers is configured "master" during the edge-folding and gluing operations. Consequently, the control of the respective machine functions, like actuation of the edge-turning members, or of the glue-sprayers, is controlled in these steps by the controller of the machine as slave to the position of the mover detected by the controller of the conveyor. For example, the front or rear mover can be configured master by the controller machine and consequently the position of said mover will control the machine functions involved.

Conversely, a pair of movers can be configured "slave" during the box-receiving step. In this step, for example, the control of the feeder masters the conveyor, i.e. the position of the movers. This allows reaching the aims of one or more embodiments of the invention, optimising the interfacing between the machine functions and the control of the conveyor. One or more embodiments of the invention thus achieves the above mentioned purposes.

The invention claimed is:

1. A packaging machine for packaging articles into containers, the packaging machine comprising:
   a plurality of work stations, each of the plurality of work stations including one or more working devices;
   at least one conveyor arranged to convey articles and/or containers between the plurality of work stations, the at least one conveyor being of a magnetic-drive type including a path and a plurality of movers moveable along the path and independently controllable; and
   a control system including a first controller that controls the one or more working devices of the plurality of work stations and a second controller that controls independent displacement of the plurality of movers along the path, the control system configured to dynamically vary a master/slave configuration between the first controller and the second controller.

2. The packaging machine according to claim 1, wherein the second controller is dynamically configured as master or slave with respect to the first controller, depending on a position of the at least one mover or the at least one group of movers along the path.

3. The packaging machine according to claim 2, wherein the control system is configured so that:
   for at least one mover or at least one group of movers at, or close to, at least a first work station of the plurality of work stations, the second controller is configured as master to the first controller for controlling at least one working device of the one or more working devices of the first work station through the first controller; and
   for at least one mover or the at least one group of movers at, or close to, at least a second work station of the plurality of work stations, the second controller is configured as slave to the first controller controlling the at least one working device of the one or more working devices of the second work station.

4. The packaging machine according to claim 1, wherein the first controller controls devices of the packaging machine and the second controller controls magnetic actuation of the at least one conveyor and movement of the plurality of movers, the first and second controllers interfacing with one another to obtain the dynamic variation of master/slave configuration.

5. The packaging machine according to claim 4, wherein the second controller determines respective laws of motion for the plurality of movers or groups of movers of the plurality of movers, as a function of parameters generated by the first controller.

6. The packaging machine according to claim 4, wherein the first and second controllers are grouped in a single controller.

7. The packaging machine according to claim 1, wherein the control system is configured to partition the path of the at least one conveyer into a plurality of work sections, where respective working devices of the one or more working devices are arranged, and to dynamically configure at least one mover of the plurality of movers or group of movers of the plurality of movers travelling through each work station as master or slave to the respective working devices.

8. The packaging machine according to claim 1, wherein the control system is arranged to control motion of the plurality of movers in groups, along at least part of the path.

9. The packaging machine according to claim 8, wherein the groups include a front mover and a rear mover.

10. The packaging machine according to claim 9, wherein the front mover and the rear mover are positioned at a predetermined distance so that a group of movers can receive an article or a container between the front mover and the rear mover.

11. The packaging machine according to claim 9, wherein the groups of movers are represented by two or more movers.

12. The packaging machine according to claim 1, wherein the at least one conveyor includes a plurality of magnetic-drive conveyors, wherein the plurality of movers or groups of the plurality of movers of each of the plurality of magnetic-drive conveyors are dynamically configured as master or slave to the one or more working devices.

13. The packaging machine according to claim 1, wherein the plurality of work stations include:
   a waiting station for the formation of the containers,
   a forming station of the containers, wherein a container is delivered to the conveyor;
   a flap-closing station;
   a loading station of articles into boxes;
   a box-closing station;
   a delivery station of closed boxes from the conveyor to an outfeed device; and
   a queuing station.

14. The packaging machine according to claim 1, wherein the control system switches between:
   a first state where the second controller has unidirectional control over the one or more working devices interacting with the plurality of movers through the first controller; and
   a second state where the first controller has unidirectional control over the motion control of the plurality of movers interacting with the one or more working devices through the second controller.

15. A method for controlling a packaging machine, wherein the packaging machine includes a plurality of work stations with respective working devices and at least one magnetic mover conveyor including a path and a plurality of movers moveable along the path and independently controllable, the method comprising:
   with a control system that includes a first controller and a second controller, dynamically varying a master/slave configuration between the first controller and the second controller, wherein the first controller controls the working devices of the plurality of work stations and the second controller controls independent displacement of the plurality of movers along the path.

16. The method according to claim 15, wherein the first controller and the second controller are dynamically configured as master or slave to the control of one or more of the respective working devices of the packaging machine, depending on a position of the at least one mover or the at least one group of movers along the path.

17. The method according to claim 15, wherein the plurality of movers are controlled in groups along at least part of the path of the at least one magnetic mover conveyor, each of the groups including two or more movers including a front mover and a rear mover, the front mover and the rear mover being at a predetermined distance apart so that the group of movers can receive an article or container between the front mover and rear mover.

* * * * *